United States Patent [19]

Haganuma

[11] Patent Number: 4,488,827
[45] Date of Patent: Dec. 18, 1984

[54] CONTINUOUS VERTICAL LINE PRINT CONTROL SYSTEM

[75] Inventor: Tomoyuki Haganuma, Yokohama, Japan

[73] Assignee: Ricoh Company, Ltd., Japan

[21] Appl. No.: 491,933

[22] Filed: May 5, 1983

[30] Foreign Application Priority Data

May 6, 1982 [JP] Japan .................................. 57-74535

[51] Int. Cl.³ .......................... B41J 29/26; B41J 3/12
[52] U.S. Cl. .................................... 400/17; 400/120;
400/121; 400/303; 400/611; 346/23
[58] Field of Search ................. 400/17, 120, 121, 124,
400/76, 611, 303; 346/76 PH, 23

[56] References Cited

U.S. PATENT DOCUMENTS 3,888,340 6/1975 Hoffman ............................. 400/611
4,140,404 2/1979 Kaenel ............................ 400/121 X

FOREIGN PATENT DOCUMENTS 20385 2/1982 Japan ..................................... 400/17
108976 7/1982 Japan ................................... 400/121
129760 8/1982 Japan ................................... 400/124
137166 8/1982 Japan ................................... 400/121

Primary Examiner—Paul T. Sewell
Attorney, Agent, or Firm—Guy W. Shoup

[57] ABSTRACT

A system and method for controlling printing to allow to obtain a long vertical line which is continuous even if a reduction in height of font is produced due to the occurrence of font change between the two consecutive print lines is provided.

6 Claims, 9 Drawing Figures

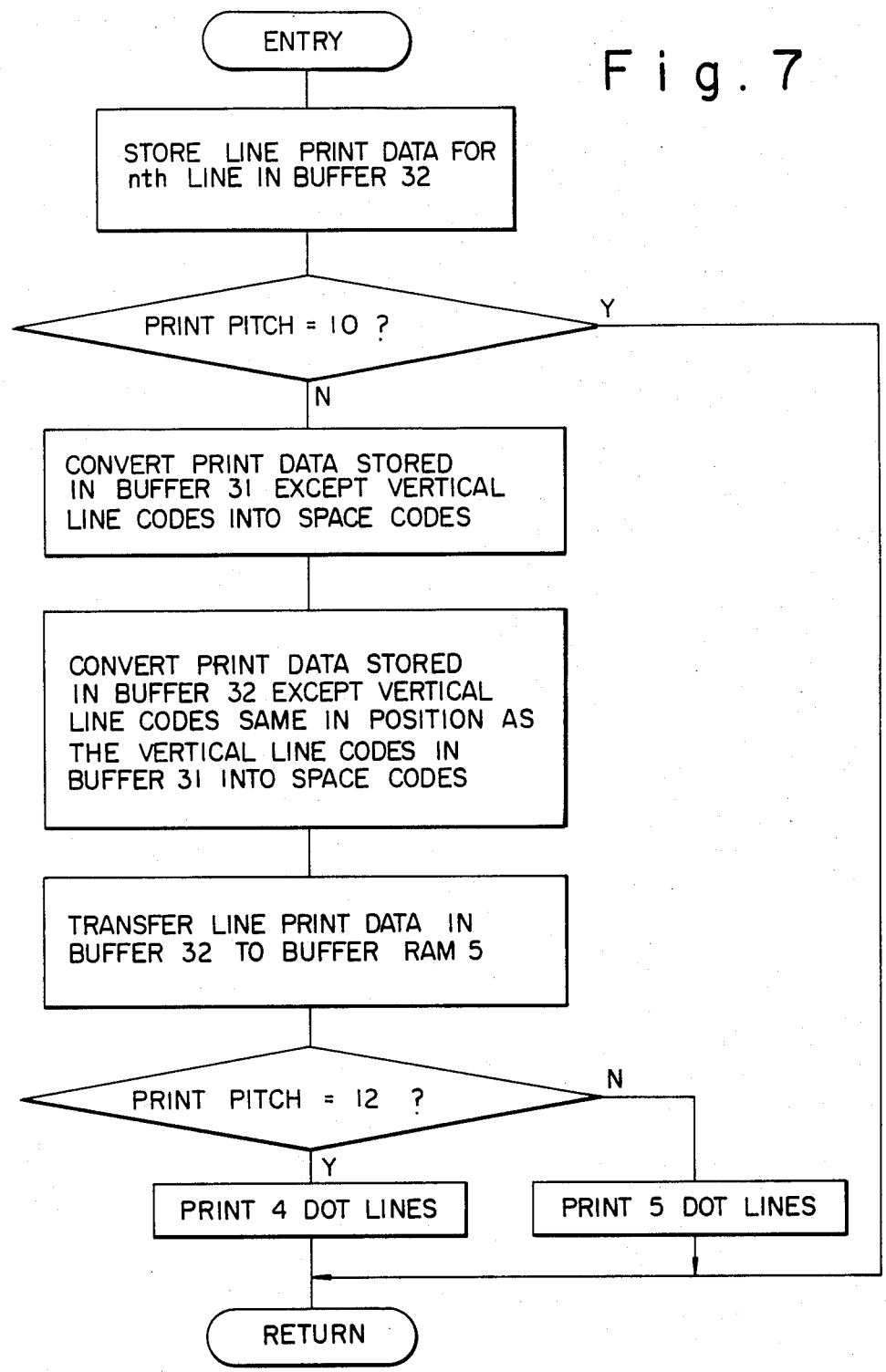

CONTINUOUS VERTICAL LINE PRINT CONTROL SYSTEM

BACKGROUND OF THE INVENTION

1. Field of the Invention

This invention generally relates to printers of the type which print characters in the form of dot matrix, and, in particular, to a system for controlling the printing of a continuous vertical line in such printers. More specifically, the present invention relates to a printer, such as a thermal line printer, which is capable of printing characters in the form of dot matrix with a plurality of different kinds of fonts different in size, in particular vertical length.

2. Description of the Prior Art

Recently, there has been developed a terminal having both a document creating and editing function and a communicating function, such as a communication wordprocessor and a wordprocessor capable of carrying out international communication. In such communication wordprocessors, especially those capable of carrying out international communication, printers to be used for printing document information are often required to be variable in print pitch, or character spacing. Typically, there are three print pitches: print pitch 10—10 characters per inch; print pitch 12—12 characters per inch; and print pitch 15—15 characters per inch, and printers to be used with internationally communicatable wordprocessors are usually required to be operable selectively at one of these three print pitches. In such a case, printers must be provided with three fonts different in size vertically as well as horizontally.

Under the circumstances, there has been proposed a thermal line printer capable of printing characters with one of a plurality of different fonts selectively. In such a thermal line printer, however, in the case of printing vertical lines, for example, in forming a table, if fonts differ between the two consecutive print lines as changed from a lower pitch to a higher pitch, for example from print pitch 10 to print pitch 15, there result discontinuous vertical lines because the font of print pitch 15 is shorter than the font of print pitch 10 in the vertical direction. This is disadvantageous since such discontinuous vertical lines are usually not wanted.

SUMMARY OF THE INVENTION

The above-described disadvantages are overcome with the present invention, and a print control system allowing to print continuous vertical lines even if the font changes is provided.

Therefore, a primary object of the present invention is to improve printers.

Another object of the present invention is to improve printers capable of printing characters such as letters, marks and numerals in one of a plurality of fonts selectively.

A further object of the present invention is to provide a print control system for controlling printing to obtain continuous verical lines even if the font changes between the two consecutive print lines.

A still further object of the present invention is to provide a print control system for use in a printer, such as a thermal line printer, which is capable of printing characters in one of a plurality of fonts different in size selectively, particularly in height, to control the printing thereby allowing to obtain a continuously printed vertical line even if the font changes.

Other objects, advantages and novel features of the present invention will become apparent from the following detailed description of the invention when considered in conjunction with the accompanying drawings.

BRIEF DESCRIPTION OF THE DRAWINGS

FIG. 7 is a flow chart useful for explaining the operation of one embodiment of the present invention.

DESCRIPTION OF THE PREFERRED EMBODIMENTS

Figure 1:
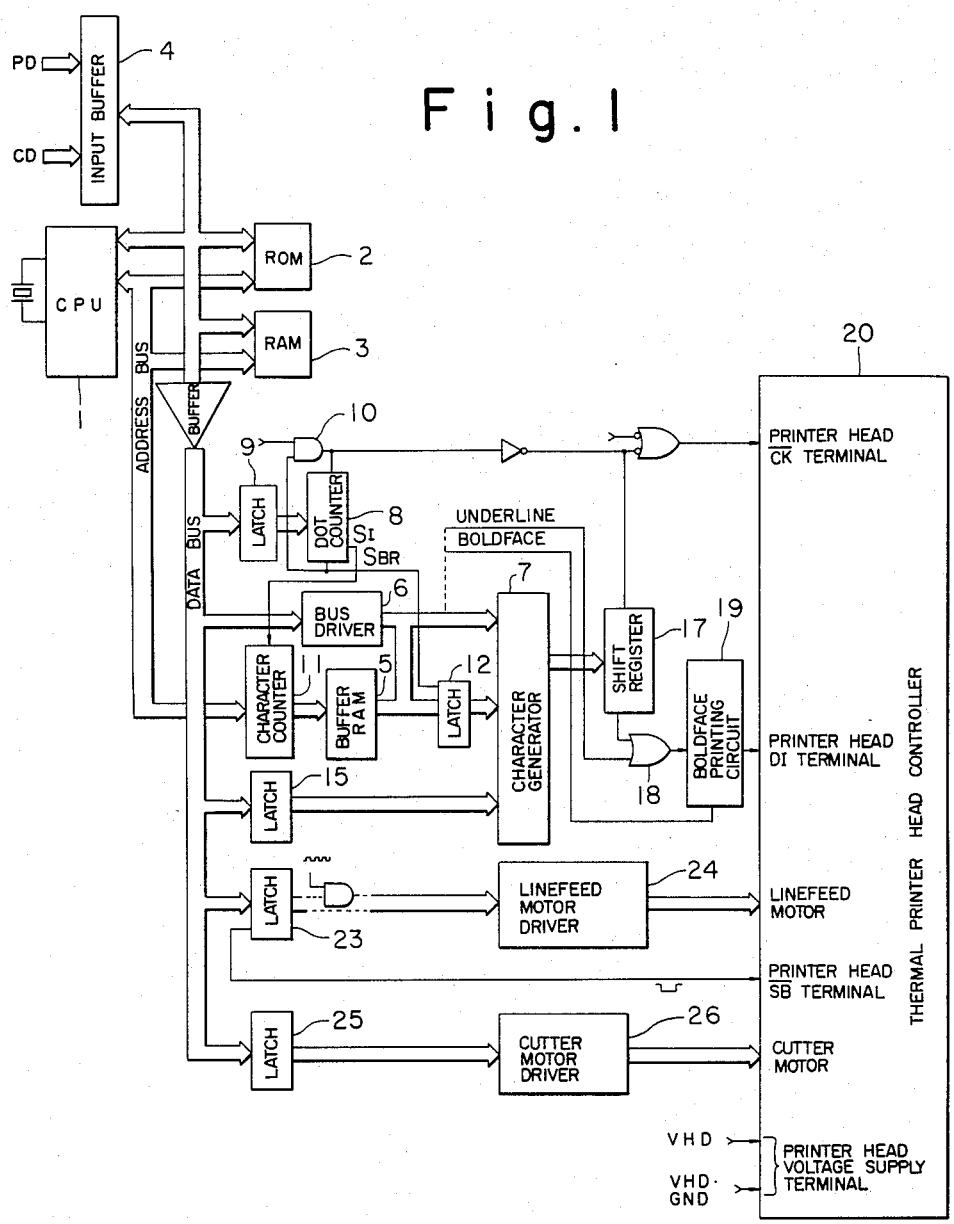
FIG. 1 is a block diagram showing the overall structure of a print control system for use in a thermal line printer embodying the present invention.
Figure 2:
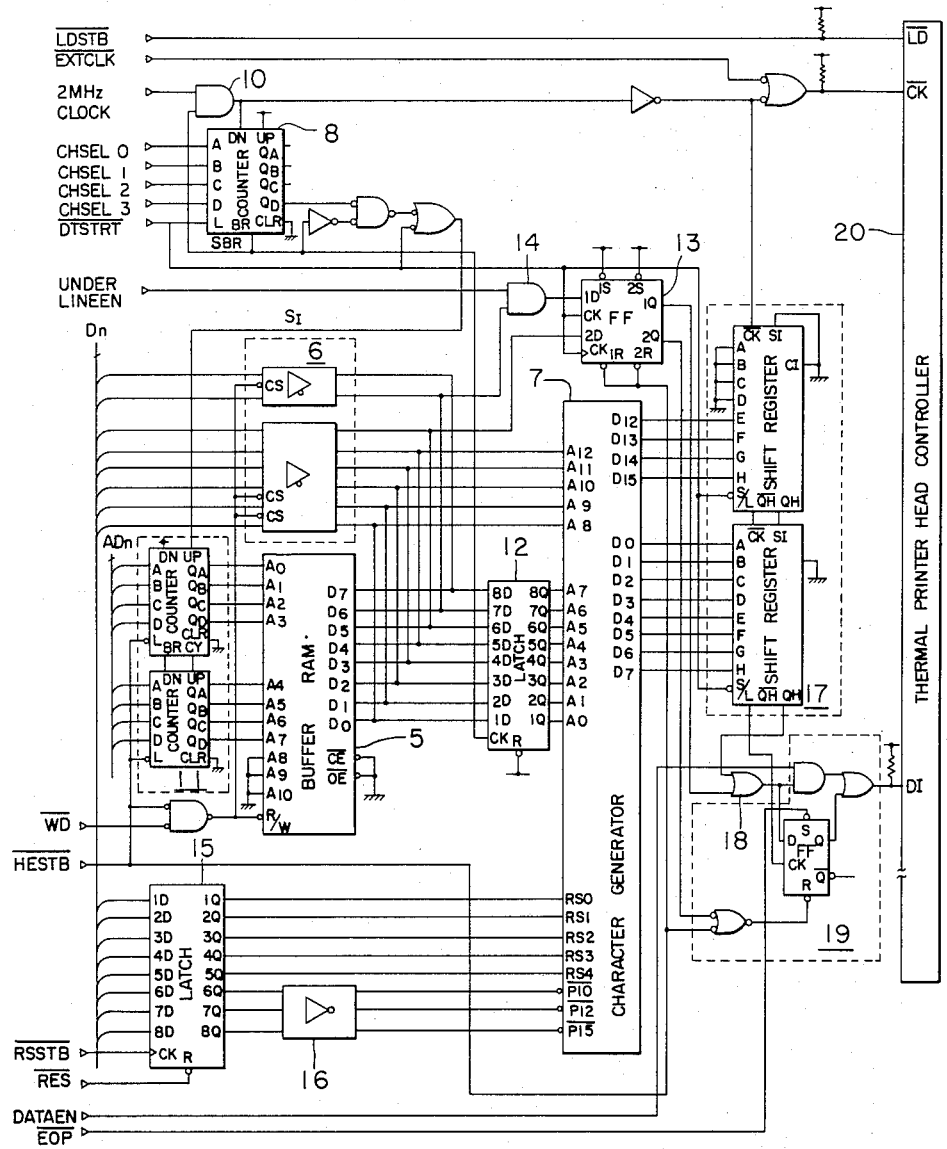
FIG. 2 is a block diagram showing in detailed the main portion of the structure of FIG. 1.

Referring now to FIGS. 1 and 2, there is shown a print control system for use in a thermal line printer constructed in accordance with one embodiment of the present invention. It should however be noted that although the following description will be made when the present invention is applied to a thermal line printer, the present invention should not limited only to such application, and it may be equally applied to other types of printers.

The top left portion of FIG. 1 includes such elements as central processing unit or CPU 1, a read only memory or ROM 2 and a random access memory or RAM 3, which together define a microcomputer control section. While an on-line switch (not shown) of a printer is on, character information PD and control information CD are received by an input buffer 4, and they are appropriately processed by means of the microcomputer control section. The ROM 2 stores a predetermined print control program for controlling printing operation. The operation of printing a continuous vertical line in the same column when the font changes between the two consecutive print lines is carried out in accordance with the program stored in the ROM 2.

Figure 3:
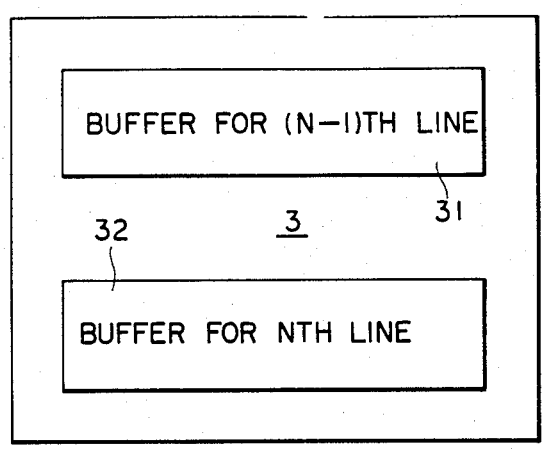
FIG. 3 is a schematic illustration showing more in detail the structure of RAM 3 shown in FIG. 1.

As shown in FIG. 3, the RAM 3 includes a (n−1)th line buffer 31 for temporarily storing print data to be printed at (n−1)th print line on recording paper and a nth line buffer 32 for temporarily storing print data to be printed at the nth print line, which is a next print line immediately following the (n−1)th print line spaced apart over a predetermined distance. Each print data is comprised of a basic character data and a character modification data which includes information for modifying the associated basic character such as diacritical mark, boldface, underline, etc. It is to be noted that the RAM 3 also includes a working area for executing a program, and a portion of such a working area is used as a line counter to count the number of lines or rows on a single page of document to be printed.

As shown in FIG. 1, an address bus is provided to interconnect the CPU 1 with a character counter 11. The address bus is also connected to the ROM 2 and RAM 3. Then the character counter 11 is connected through a bus to a buffer RAM 5. Thus, at the time of carrying out printing for a single print line, the basic character data and character modifying data stored in the RAM 3 are transferred through a bus driver 6 to the buffer RAM 5 where information is stored one character for each address.

Figure 4A:
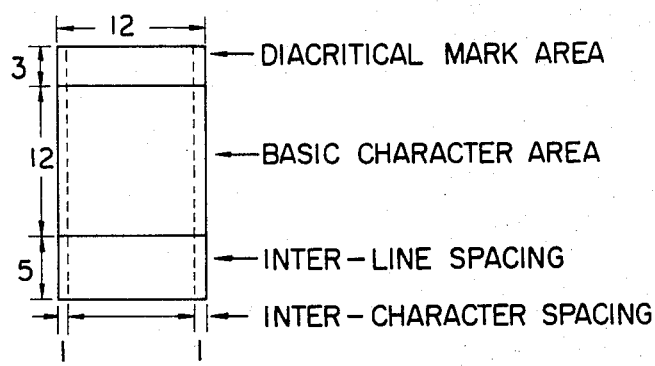
FIGS. 4a–4c are schematic illustrations of three different fonts, print pitch 10, print pitch 12 and print pitch 15, respectively, each showing the corresponding dot pattern structure of character information stored in character generator 7 shown in FIGS. 1 and 2.
Figure 4B:
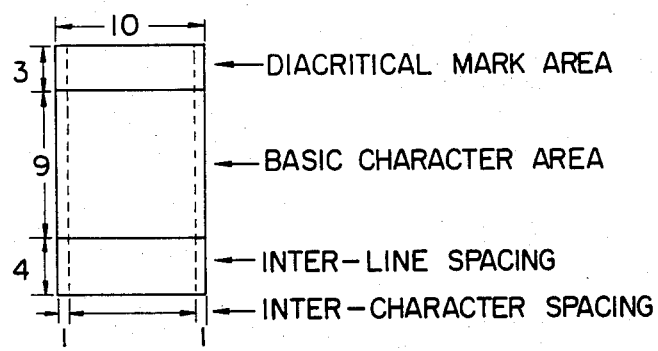
Figure 4C:
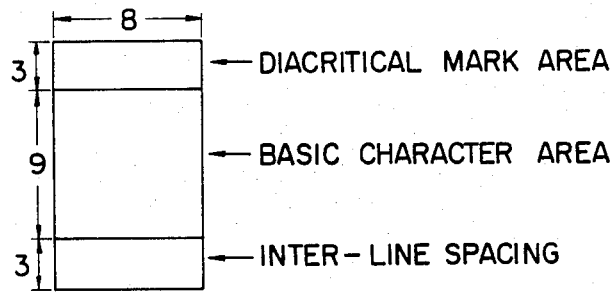

The buffer RAM 5 is connected through a latch 12 to a character generator 7 comprised of a plurality of ROMs each storing character information in the form of dot matrix in a different font. In the present embodiment, the character generator 7 contains character information of three kinds of font different also in height. Described more in detail in this respect, as shown in FIG. 4a, a single character is represented by a 20 row by 12 column dot matrix for the font of print pitch 10; on the other hand, as shown in FIGS. 4b and 4c, characters of print pitches 12 and 15 are represented by $16 \times 10$ and $15 \times 8$ dot matrix patterns, respectively. As shown, each dot matrix includes an inter-line spacing at its bottom, so that if the line pitch or the distance of each line feed operation corresponds to the height or the number of dot rows, no undesired gap will be produced between the two adjacent print or character lines as long as the font remains unchanged.

Figure 5:
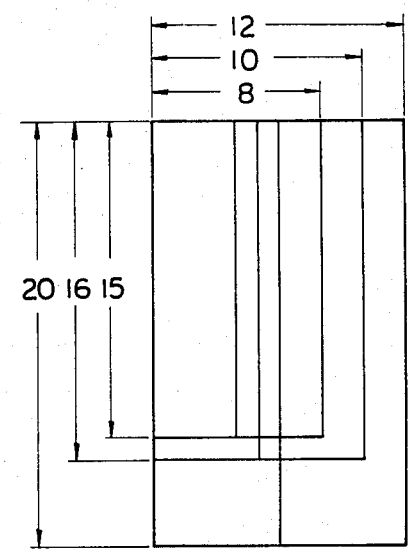
FIG. 5 is a schematic illustration showing vertical lines printed in the above-mentioned three different fonts.

FIG. 5 shows three vertical lines printed in print pitches 10, 12 and 15, respectively. As shown, in each font, the vertical line is defined by a column of dots of the maximum number of dot rows. Thus, as long as vertical lines are printed in consecutive print lines at the same column position without change in font, an extended continuous vertical line can be obtained.

As shown in FIGS. 1 and 2, also provided is a data bus connected between the microcomputer control section including the CPU 1, ROM 2 and RAM 3 and the input buffer 4. The data bus is also connected to a dot counter 8 through a latch 9. As shown in FIG. 2, print pitch select signals CHSEL0 through CHSEL3 are supplied to the dot counter 8 whereby the dot counter 8 is established as a divide-by-n counter in accordance with the number of dots per character. The data of the number of dots per character is loaded into the dot counter 8 by a dot start signal $\overline{DTSTRT}$, which is supplied to the dot counter 8 through the latch 9 once for each character. On the other hand, a dot clock signal of 2 MHz is supplied to terminal DN of the dot counter 8 through an AND circuit 10 so that the count of the dot counter 8 is decremented by 1 at a time.

Figure 6:
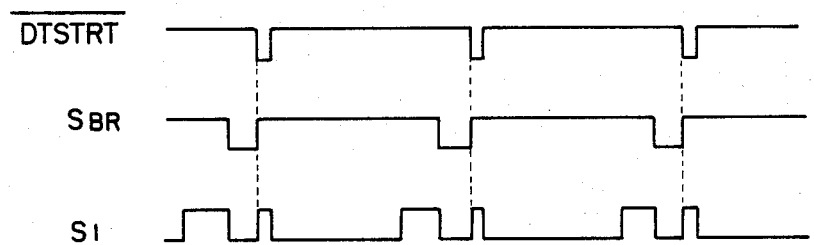
FIG. 6 is a timing chart showing the timed relation among some signals associated with dot counter 8 shown in FIGS. 1 and 2.

The dot counter 8 is so structured to supply a $Q_D$ output twice per character, and when its count has reached "0", a borrow signal $S_{BR}$ is output from borrow terminal $B_R$ and the dot counter 8 ceases its operation. That is, as shown in FIG. 6, before the count reaches "0", the dot counter 8 supplies two increment signals $S_I$ from the $Q_D$ terminal. The increment signal $S_I$ becomes Hi when the state of the $Q_D$ terminal becomes Lo.

The count of the character count 11 is incremented by 1 each time upon receipt of an increment signal $S_I$ supplied from the dot counter 8. Each time when one character section of one dot line is scanned, a dot start signal $\overline{DTSTRT}$ is produced. And in association with the falling end of the dot start signal, the basic character data section of buffer RAM 5 is addressed; whereas, the character modifying data section of buffer RAM 5 is addressed in association with the output of a borrow signal $S_{BR}$ from the dot counter 8.

The basic character data supplied from the buffer RAM 5 is latched into the latch 12, and, upon receipt of a borrow signal $S_{BR}$ supplied from the dot counter 8, the basic character data now latched in the latch 12 is transferred to the character generator 7 at its terminals $A_0$ through $A_7$. As shown in FIG. 2, when a character modifying data is supplied as an output from the buffer RAM 5 in timed relation with the supply of a borrow signal $S_{BR}$ from the dot counter 8, its diacritical mark data is input to terminals $A_8$ through $A_{12}$ of the character generator 7, its boldface print data is input to terminal 2D of a latch 13 and its underline print data is input to one input of an AND circuit 14 which has its the other input connected to receive an underline enable signal UNDERLINEEN, which becomes Hi when an underline is to be printed, and has its output connected to terminal 1D of the latch 13. Underline print data and boldface print data are latched into the latch 13 in association with the input timing of the next dot start signal $\overline{DTSTRT}$.

Another latch 15 is provided as connected to the data bus. A print or horizontal pitch data is latched into the latch through terminals 6D through 8D, and a row or vertical pitch data, in particular its start and end data, is latched into the latch 15 through terminals 1D through 5D. On the other hand, a chip select signal is supplied from terminals 6Q through 8Q of the latch 15 via a bus driver 16 to the character generator 7 so that a particular ROM which is provided in the character generator 7 and which contains character information of the size corresponding to a selected print pitch is selected. From terminals 1Q through 5Q of the latch 15 is supplied a dot line select Lo signal, which is incremented by 1 each time upon printing a single dot line and which is supplied to the character generator 7.

As a result, the character generator 7 causes the ROM selected by a chip select signal from the latch 15 to supply in parallel a combined dot pattern data, which is a combination of the dot pattern data corresponding to the basic character data and diacritical mark data input to the character generator 7, to a shift register 17. At the rising end of the dot start signal $\overline{DTSTRT}$, the shift register 17 becomes a loading condition thereby allowing to receive dot pattern data from the character generator 7. When Hi is applied to terminal S/L of the shift register 17, a shift enable condition is established, thereby serially outputting the dot pattern data in synchronism with a dot clock signal.

The dot pattern data serially output from the shift register 17 is supplied to one input of an OR circuit 18 whose the other input is connected to receive an underline print data output from terminal 1Q of the latch 13. The output of the OR circuit 18 is connected to a boldface printing circuit 19 which is also connected to receive a boldface print data from terminal 2Q of the latch 13 for controlling boldface printing. The boldface printing circuit 19 has its output connected to terminal DI of a thermal printer head controller 20. Although not shown specifically, it should be understood that the thermal printer head controller 20 includes a register capable of storing print data for an entire dot line. Thus, when a dot clock signal is supplied to a terminal $\overline{CK}$ of the controller 20, print data is fed into the register through the terminal DI and then the entire dot line is printed at the same time when a pulse is supplied to a terminal $\overline{\text{LD}}$ of the controller 20.

As shown in FIG. 1, also provided as connected to the data bus is a further latch 23 which is connected to a line feed motor driver 24, which, in turn, is connected to a line feed motor for causing the recording paper to move in the line feed direction, which is orthogonal to the line printing direction. A still further latch 25 is provided as connected to the data bus, and it supplies an ON/OFF signal to a cutter motor driver 26, which controls the operation of a cutter (not shown) for severing the recording paper at an appropriate length. It should thus be understood that the recording paper used in the present embodiment is preferably in the form of a roll.

Now, the operation of printing a single print line in the embodiment having the above-described structure will be explained hereinbelow.

In the first place, when printing is desired to be carried out over a single print line, the basic character data and character modifying data for a single print line stored in the RAM 3 are transferred to the buffer RAM 5. Then the buffer RAM 5 is addressed under the control of the character counter 11 whose timing is regulated by the dot counter 8, whereby basic character data and diacritical mark data are output in a time sharing fashion one character at a time thereby having the basic character data and diacritical mark data separately supplied to the character generator 7. At the same time, boldface print data and underline print data are supplied to the latch 13.

At this juncture, the latch 15 supplies to the character generator 7 a Lo signal which is incremented by 1 for each dot print line. Accordingly, the dot pattern data corresponding to the basic character data and diacritical mark data input to the character generator 7 are supplied in parallel to the shift register 17 dot print line by dot print line under the control of a Lo signal supplied from the latch 15. Then the parallel-in-serial-out shift register 17 causes the data to be serially supplied to the terminal DI of the thermal printer head controller 20 via the OR circuit 18 and boldface printing circuit 19. Consequently, characters in a single print line are gradually printed one dot print line after another until all of the dot print lines in a single print line in a selected print pitch have been printed.

When the underline print position is reached, the underline enable signal UNDERLINEEN becomes Hi, so that the underline print data among the character modifying data supplied from the buffer RAM 5 is latched into the latch 13. Thus the underline print data output from the terminal 1Q of the latch 13 and the dot pattern data output from the shift register 17 are applied to respective inputs of the OR circuit 18 whose output is applied to the controller 20 to print an underline. On the other hand, in the case of boldface printing, the boldface printing circuit 19 controls printing such that the same character is printed twice with a sidewize shift in position over a dot pitch.

Upon completion of printing a single print line as described above, the following operation will follow. This portion of the print control program stored in the ROM 2 is shown in FIG. 7 in the form of a flow chart, and it is directed to compensate the discrepancy in height of font which is caused when the font changes between the two consecutive print lines from the taller one to the shorter one, for example from the font of print pitch 10 to the font of print pitch 15.

Now, let us assume that printing has heretofore been carried out with the font of print pitch 10. Then, upon completion of printing the (n−1)th line, the line print data for the nth line are transferred to and stored in the buffer 32 of the RAM 3. Thereafter, a test is made to determine whether or not the nth line is to be printed by the font of print pitch 10. If the result is affirmative, the program proceeds to "RETURN" thereby having the nth line printed immediately because no gap will be produced between the two consecutive vertical lines in the same column position even if a vertical line code is present in the nth line.

On the other hand, if the result of the above test is negative, indicating the nth line to be printed by the font of a print pitch other than print pitch 10, all of the print data except vertical line codes in the line print data for the (n−1)th line stored in the buffer 31 of the RAM 3 are converted into the space code or other invalid code. And then all of the print data except those vertical line codes present same in column position as the vertical line codes present in the line print data for the (n−1)th line in the line print data for the nth line stored in the buffer 32 are converted into the space code or other invalid code, and the thus converted line print data in the buffer 32 is then transferred to the buffer RAM 5.

Then, a test is made to determine whether or not the font of print pitch 12 is to be used for printing the nth line. If affirmative, the first four dot print lines of the converted line print data in the buffer 32 are printed additionally. On the other hand, if the result of the test is negative, indicating that the font of print pitch 15 is to be used for printing the nth print line, the first five dot print lines of the converted line print data in the buffer 32 are printed additionally. After printing these four or five additional dot print lines, printing is carried out for the nth line.

As shown in FIG. 5, the font of either of print pitch 12 or print pitch 15 is shorter in height or vertical length than the font of print pitch 10 by four or five dots, respectively. Therefore, if the font changes from that of print pitch 10 to that of print pitch 12 or 15 while maintaining the vertical print pitch unchanged, a gap of four or five dots is created between the two vertical lines located at the same column position in the two consecutive print lines, i.e., (n−1)th and nth lines.

Under the circumstances, in addordance with the present invention, if the font changes between the (n−1)th line and the nth line from a larger-sized one to a smaller-sized one and vertical line codes are present both in the (n−1)th and nth lines at the same column position, additional printing is carried out subsequent to the printing of the (n−1)th line to compensate the discrepancy in size, or height to be exact, between the (n−1)th and nth lines. Such an additional printing is to print a certain number of print dot lines. For example, if the font change takes place from that of print pitch 10 to that of print pitch 12, four consecutive print dot lines are printed. In the case of changes in font from that of print pitch 10 to print pitch 15, five consecutive print dot lines are printed. Similarly, additional printing of print dot lines should take place when the font changes between the (n−1)th and nth lines from that of print pitch 12 to that of print pitch 15. Having carried out such an additional printing for compensation, the nth line is printed by the newly selected font.

With the above-described structure, the vertical lines printed at the same column position in the (n−1)th and nth print lines become joined thereby allowing to provide a long continuous vertical line.

Although the above-described embodiment is the case when the present invention is applied to the printer having three kinds of fonts which are different at least in height or vertical length, the present invention should not only be limited to this and it can also be applied to other printers having two kinds or four or more kinds of fonts which may be used selectively for printing. Furthermore, in the above-described embodiment, the dot matrix pattern of each font is so structured to include an interline spacing, as shown in FIGS. 4a through 4c, without a gap between the two consecutive fonts or dot matrix patterns of print pitch 10 when printed in the two consecutive print lines. However, in the case where a gap of N number of print dot lines exists between the two consecutively printed dot matrix patterns or fonts of print pitch 10, it is only necessary to carry out additional printing of print dot lines for the number of print dot lines corresponding to the reduction in height of font plus N number of print dot lines in order to obtain a long printed vertical line which extends continuously. Such a long continuous vertical line is comprised of a number of dots arranged vertically at the dot pitch of the dot matrix pattern. Thus, if such a dot pitch is set reasonably small, the line will appear to be continuous. In such a case, in order to obtain a long vertical line without a gap as printed on recording paper, the font of print pitch 10 remains unchanged between the two consecutive print lines, N number of print dot lines must be printed additionally between the two lines. If the font change takes place from that of print pitch 10 to that of print pitch 12, (4+N) number of print dot lines must be additionally printed; whereas, if the font change takes place from that of print pitch 10 to that of print pitch 15, (5+N) number of print dot lines must be additionally printed.

As discussed in detail above, the present invention allows to obtain a printed continuous vertical line, short or long, even if a reduction in height of font takes place between the two consecutive print lines.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A print control system for use in a printer capable of carrying out printing at a predetermined print line pitch with a selected one of a plurality of different kinds of fonts which are different in size, at least in height, said system comprising:

first storing means for storing a first set of line print data to be used for printing a (n−1)th print line, where n is a positive integer;

second storing means for storing a second set of line print data to be used for printing a nth print line which immediately follows said (n−1)th print line; and additional vertical line printing control means for printing at least one additional vertical line between said (n−1)th and nth print lines if a reduction in height of font occurs due to change in font from said (n−1)th print line to said nth print line and if said first set of line print data includes at least one vertical line code and said second set of line print data includes at least one vertical line code located in the same column position as said at least one vertical line code in said first set of line print data.

2. A method for controlling printing of a printer capable of carrying out printing at a predetermined print line pitch with a selected one of a plurality of different kinds of fonts which are different in size, at least in height, said method comprising the steps of:

storing a first set of line print data to be used for printing a (n−1)th print line in a first buffer memory, where n is a positive integer;

storing a second set of line print data to be used for printing a nth print line in a second buffer memory, which immediately follows said (n−1)th print line; and printing at least one additional vertical line between said (n−1)th and nth print lines if a reduction in height of font occurs due to change in font from said (n−1)th print line to said nth print line and if said first set of line print data includes at least one vertical line code and said second set of line print data includes at least one vertical line code located in the same column position as said at least one vertical line code in said first set of line print data thereby allowing to form a printed long vertical line which is continuous.

3. A method of claim 2, wherein each of said fonts is defined in the form of m x n dot matrix, where m and n are positive integers.

4. A method of claim 3, wherein, prior to the step of printing at least one additional vertical line, said second set of line print data stored in said second buffer memory except those vertical line codes which are located same in column position as vertical line codes of said first set of line print data stored in said first buffer memory are all converted to a predetermined code.

5. A method of claim 4, wherein said predetermined code is a space code.

6. A method of claim 4, wherein said predetermined code is an invalid code.

* * * * *